US006743359B1

(12) United States Patent
Smyth et al.

(10) Patent No.: US 6,743,359 B1
(45) Date of Patent: Jun. 1, 2004

(54) HYDROCYCLONE

(75) Inventors: Ian C. Smyth, Winchester (GB); Peter A. Thompson, Gloucester (GB)

(73) Assignee: Petreco International Ltd., Rugby (GB)

( * ) Notice: Subject to any disclaimer, the term of this patent is extended or adjusted under 35 U.S.C. 154(b) by 5 days.

(21) Appl. No.: 10/049,956

(22) PCT Filed: Aug. 17, 2000

(86) PCT No.: PCT/GB00/03203

§ 371 (c)(1), (2), (4) Date: Jun. 15, 2002

(87) PCT Pub. No.: WO01/12334

PCT Pub. Date: Feb. 22, 2001

(30) Foreign Application Priority Data

Aug. 17, 1999 (GB) ............................................ 9919462

(51) Int. Cl.[7] ........................ B01D 17/038; B01D 21/26; B04C 5/04; B04C 5/081

(52) U.S. Cl. .................... 210/512.1; 210/788; 209/725; 209/734

(58) Field of Search .............................. 210/512.1, 788; 209/725, 732, 734

(56) References Cited

U.S. PATENT DOCUMENTS

| | | | |
|---|---|---|---|
| 2,341,087 | A | 2/1944 | Dunham |
| 3,494,474 | A | 2/1970 | Estabrook |
| 4,067,814 | A | 1/1978 | Surakka et al. |
| 4,778,494 | A | 10/1988 | Patterson |
| 4,966,703 | A | 10/1990 | Kalnins et al. |
| 5,252,229 | A | 10/1993 | Rojey et al. |
| 5,653,880 | A | 8/1997 | Mouton |

FOREIGN PATENT DOCUMENTS

| | | |
|---|---|---|
| EP | 0 068 809 | 8/1985 |
| EP | 0 259 104 | 10/1994 |
| GB | 955308 | 4/1964 |
| GB | 2219227 A | 12/1989 |
| GB | 2 230 210 A | 10/1990 |
| GB | 2231818 A | 11/1990 |
| WO | WO 83/03369 | 10/1983 |
| WO | WO 89/08503 | 9/1989 |
| WO | WO 91/16117 | 10/1991 |
| WO | WO 97/05956 | 2/1997 |
| WO | WO-97/059956 A | 2/1997 |
| WO | WO 97/28903 | 8/1997 |

*Primary Examiner*—David A. Reifsnyder
(74) *Attorney, Agent, or Firm*—Michael J. Brown, Esq.

(57) ABSTRACT

An improved hydrocyclone provided with a back wall with at least two ramps, where the ramps impart a greater axial velocity component to the fluids at the periphery as measured radially from the longitudinal axis of the hydrocyclone and a lesser axial velocity component to portions of the incoming fluid stream closer to the longitudinal axis of the hydrocyclone. The ramps of the back wall correspond generally to the swirl pattern within the hydrocyclone, a combination of axial and tangential velocity components, enabling the incoming fluid stream to reach the desired flow pattern more quickly and efficiently than otherwise possible.

10 Claims, 4 Drawing Sheets

HYDROCYCLONE

FIELD OF THE INVENTION

The field of this invention relates to cyclonic separation of solids from liquids or liquids from liquids.

BACKGROUND OF THE INVENTION

Cyclones have been in use in separation applications in a variety of industries for many years. Typically, these devices have a cylindrical body tapering to an underflow outlet, with a tangential or involute entrance and a centrally located end connection for the overflow fluids at the head end of the hydrocyclone. These devices are used to separate fluids of different densities and/or to remove solids from an incoming stream of a slurry of liquid and solids, generally concentrating the solids in the underflow stream.

Over the years, many efforts have been undertaken to optimize the performance of hydrocyclones. Performance increase could be measured as an increase in throughput without material sacrifice in the degree of separation desired for a given operating pressure drop. An alternate way to measure improved performance is to increase the separation efficiency for a given inlet flow rate and composition.

In the past, a cyclone has been provided with a single ramp presenting a generally planar face extending at a relatively shallow angle to a radial plane of the hydrocyclone and thus inclined toward the underflow end of the hydrocyclone. Thus, when the fluid enters from the inlet, the fluid swirls about the axis of the chamber, with the back wall imparting to the mixture an axial velocity component in the direction toward the underflow outlet. This design is illustrated in PCT application WO97/05956. Also relevant to a general understanding of the principles of operation of hydrocyclones are PCT applications WO97/28903, WO89/08503, WO91/16117, and WO83/03369; U.K. specification 955308; U.K. application GB 2230210A; European applications 0068809 and 0259104; and U.S. Pat. Nos. 2,341,087 and 4,778,494.

In the past, a single helix of a uniform pitch was used to present an inclined surface to the incoming mixture. The inclined surface terminated at a step after the incoming mixture has undergone a complete revolution within the separating chamber. Thus, this prior design, illustrated in PCT application WO97/05956, took the entire incoming fluid stream and imparted a generally uniform velocity axial component to the generally helical flowpath of that entire incoming stream.

However, applicants' detailed studies of the axial flow of the fluid after it enters the hydrocyclone have revealed that, as viewed in a radial direction from the longitudinal centerline of the hydrocyclone, a preferred flow pattern would be nonuniform, with the greatest velocity being adjacent the peripheral wall of the hydrocyclone. Moving in radially from the outer periphery toward the longitudinal axis, the axial velocity component of the fluid mass decreases until it undergoes a reversal in direction representing the fluid stream that is heading toward the overflow outlet.

Accordingly, in seeking further capacity or efficiency improvements, one of the objectives of the present invention was to minimize turbulence internal to the hydrocyclone and thereby increase its performance. The capacity improvement was achieved by recognizing that in order to minimize turbulence, the incoming fluid stream should be driven axially at different velocities, depending on the radial placement of the stream within the body. Accordingly, the objective of improving throughput and/or separation efficiency has been accomplished in the present invention by recognizing this need to reduce turbulence and accommodating this performance-enhancing need by a specially designed back wall ramp featuring multiple side-by-side spiraling slopes, the steepest slope being furthest from the longitudinal axis with adjacent slopes becoming shallower as measured radially inwardly toward the longitudinal axis. Those skilled in the art will more fully appreciate the significance of the present invention by a review of the detailed description of a preferred embodiment thereof below.

SUMMARY OF THE INVENTION

An improvement is made in the efficiency and/or throughput of a hydrocyclone by providing a back wall which imparts a greater axial velocity component to the fluids at the periphery as measured radially from the longitudinal axis of the hydrocyclone and a lesser axial velocity component to portions of the incoming fluid stream closer to the longitudinal axis of the hydrocyclone. More particularly, the back wall should correspond generally to the swirl pattern within the hydrocyclone, a combination of axial and tangential velocity components, to enable the incoming fluid stream to reach the desired flow pattern more quickly and efficiently than otherwise possible.

By way of example, specific embodiments in accordance with the invention will be described with reference to the accompanying drawings in which.

Figure 1:
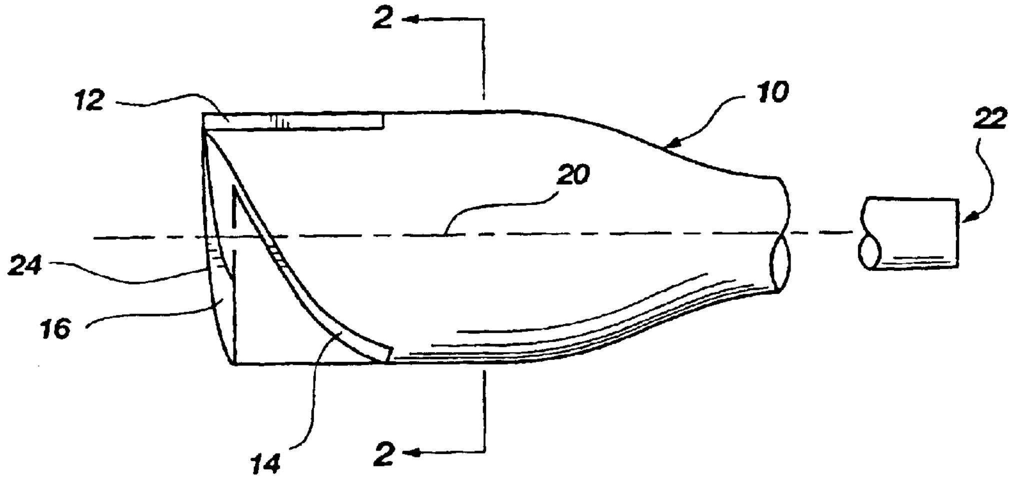
FIG. 1 is an elevation view showing the different degrees of inclination of the outer and inner ramps.
Figure 2:
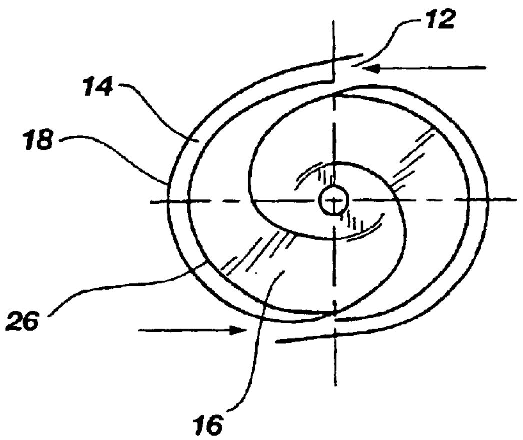
FIG. 2 is the view along lines 2—2 of FIG. 1, showing the ramps from the underside looking up toward the overflow outlet.
Figure 7:
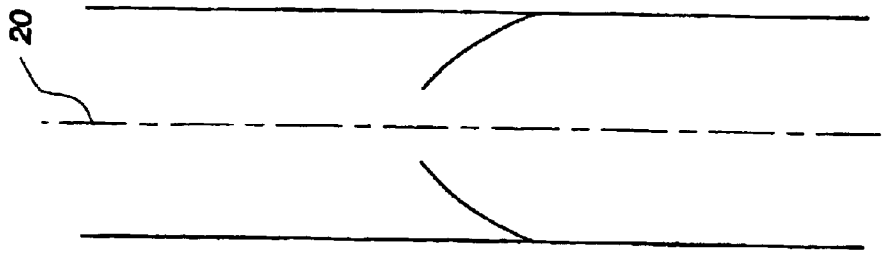

FIG. 7 is an alternative embodiment of a multiple-ramp structure shown in the other figures, showing the ability to provide a greater axial component to the fluid stream furthest from a longitudinal axis and a lesser component closer to the longitudinal axis by having a surface with curves or arcs so as to make a smoother rather than a step-wise transition from one ramp to the other as shown, for example, in FIGS. 1 and 2.

DETAILED DESCRIPTION OF THE PREFERRED EMBODIMENT

Figure 3:
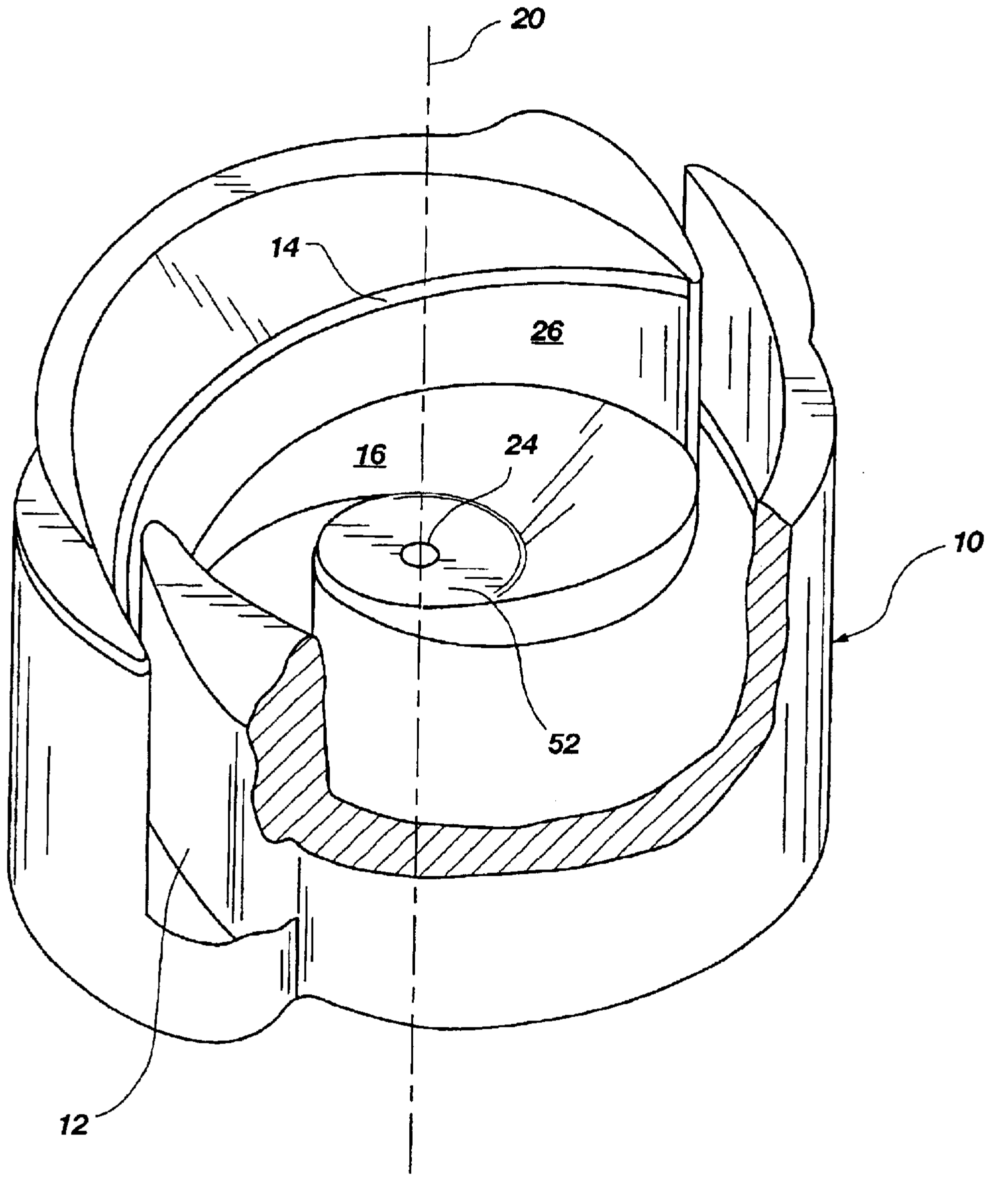
FIG. 3 is a perspective view, in part cutaway, illustrating the two ramps at different angles.

The hydrocyclone 10 has an inlet 12 which can be tangential or an involute, as illustrated in FIG. 3. One or more inlets can be used. The incoming flow stream is exposed to a steeper outer ramp 14, as well as inner ramp 16. FIG. 2 better illustrates the inlet 12 and the placement of the outer ramp 14 closest to the body 18. A longitudinal axis 20 extends from the underflow outlet 22 to the overflow outlet 24. A wall 26 marks the inside of the inner ramp 16 and spirals around longitudinal axis 20 in a general direction parallel to longitudinal axis 20 in view of the fact that the body 18 is generally cylindrical in the area of ramps 14 and 16. In the embodiment illustrated in FIG. 2, there are two inlets and the length of ramps 14 and 16 is generally 180°. Due to the spiraling orientation of ramps 14 and 16, they wind up radially adjacent to the opposing inlet by the time they have made a 180° turn inside the body 18. FIG. 2 also illustrates the inner ramp 16 extending from the lower end of wall 26 and spiraling around in the same manner as the outer ramp 14 but at a different pitch, as illustrated in FIGS. 1 and 3. Accordingly, that portion of the inlet fluid which is ramped by the inner ramp 16 is ramped at a far shallower angle than the fluid which is radially furthest from the longitudinal axis 20 which is ramped by the outer ramp 14. The provision of the dual-ramp design minimizes internal turbulence within the hydrocyclone 10 and thus improves the throughput and/or efficiency of separation of a given body design. Test comparisons of an identically configured hydrocyclone for separating oil from water, having a single inner 3° ramp compared to the same design with both a 3° inner ramp and a 10° outer ramp were undertaken. Test results indicated an increase in capacity, over a baseline hydrocyclone without such ramps, of 3% for the single-ramp design rising to 8% for the dual-ramp design without significantly affecting separation.

Referring now to FIG. 3, the overflow outlet 24 is depicted aligned with centerline 20. The inner ramp 16 is shown transitioning to the back wall 52. Back wall 52 can be flat and in a plane perpendicular to the longitudinal axis 20, or alternatively, it can be concave looking up or concave looking down with respect to the underflow outlet 22 or overflow outlet 24. The inner ramp 16 can be configured to smoothly transition into the back wall 52, or they could be at different angles, all without departing from the spirit of the invention.

Figure 4:
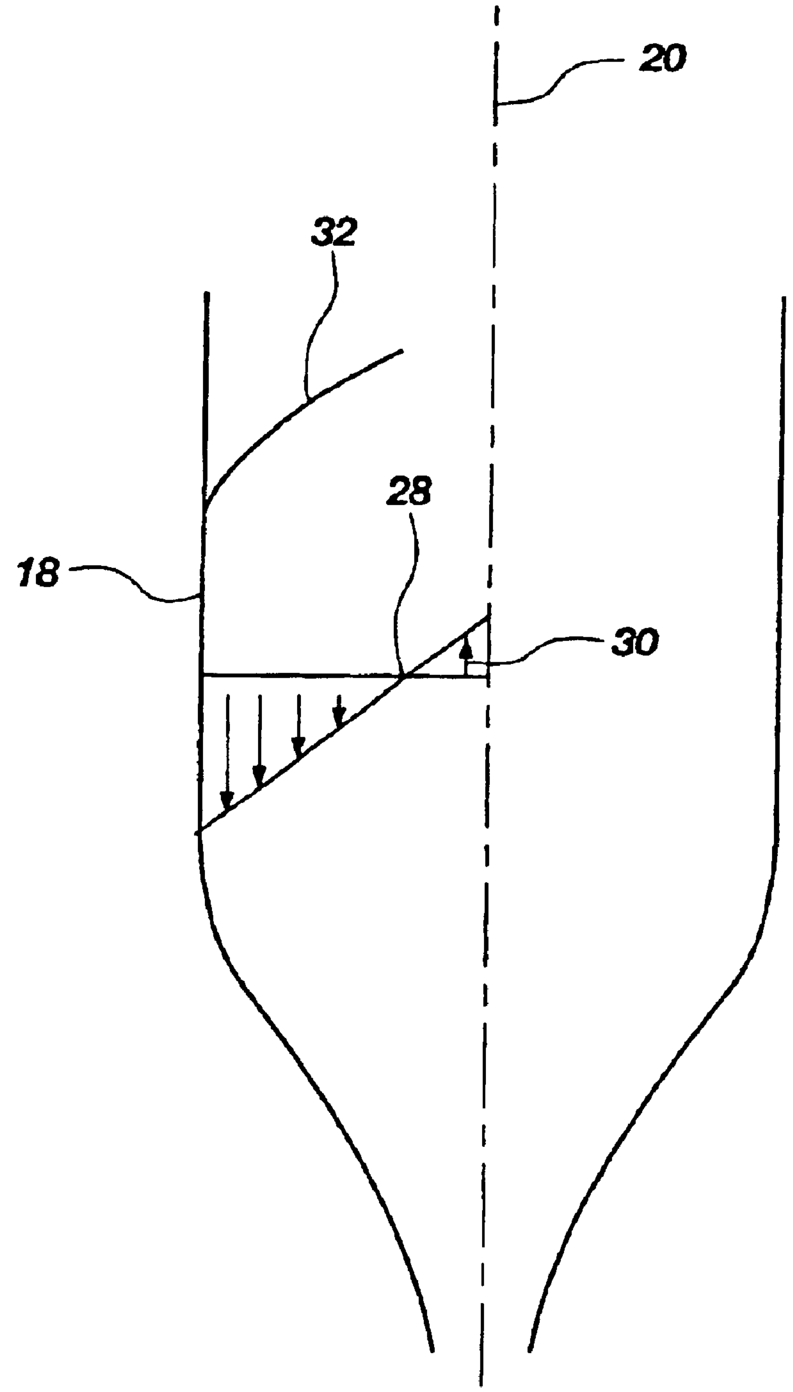
FIG. 4 is a schematic representation of the velocity distributions in the axial direction shown superimposed on a section view through the overflow and underflow connections, with an alternative embodiment of a curved ramp.

FIG. 4 illustrates conceptually the change in axial component velocity measured on a radial line from the inside wall of the body 18 to the longitudinal centerline 20. FIG. 4 illustrates that the downward axial component is greatest along the inside of body 18 and diminishes in quantity in a downward direction until it undergoes a reversal at point 28. Thereafter, arrow 30 illustrates that a velocity increase in the opposite direction toward the overflow outlet 24 is realized. The concept behind the multiple ramp of the present invention is to mimic as closely as possible the velocity profile illustrated in FIG. 4, also allowing for changes in the tangential velocity profile. This can be accomplished with two or more ramps at different grades, disposed adjacent each other and extending from the inside of body 18 to centerline 20. Rather than having discrete ramps with differing grades disposed adjacent to each other with walls spiraling generally a fixed distance from the centerline 20, the ramp of the present invention can also be designed as a continuous member which eliminates the step changes between the ramps which are taken up by wall 26, for example, as shown in FIG. 2. Instead, as shown in FIG. 4, the ramp 32 can have a steeper gradient adjacent the inner wall of body 18 and a shallower gradient toward the centerline 20, yet be composed of a more unitary construction with smoother transitions from one ramp gradient to the next and can employ curved surfaces for making such transitions, as schematically illustrated in the section view of FIG. 4.

Figure 6:
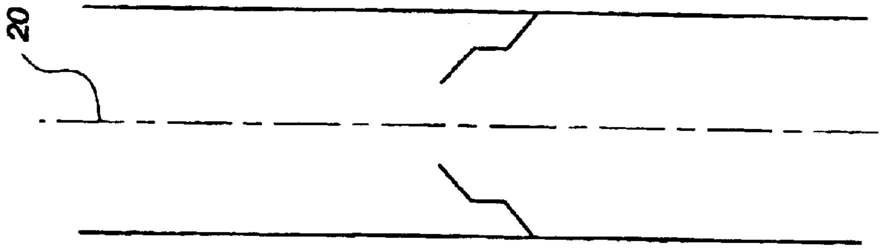
FIG. 6 is similar to FIG. 5 except the two ramps shown are disposed when a line is extended across their surface in any given section across the longitudinal axis at an angle toward the longitudinal axis.
Figure 5:
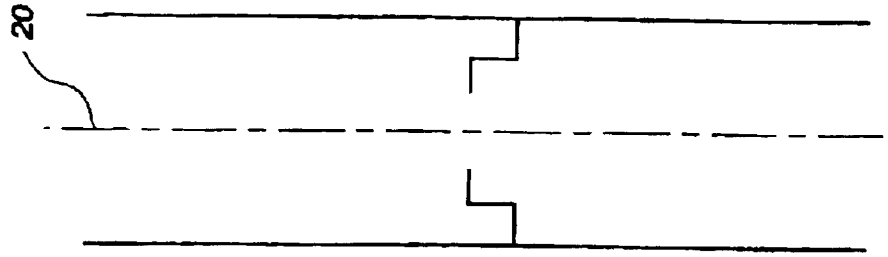
FIG. 5 is a section view through the ramp, showing that at any given section, the radial line from the longitudinal centerline coincides with the ramp surface.

FIGS. 5, 6, and 7 illustrate alternative embodiments. FIG. 5 corresponds to the dual-ramp design shown in FIG. 2, shown in one specific section view through the hydrocyclone. In this embodiment, a line drawn parallel to the ramp surface at that particular section will wind up crossing the centerline 20 at approximately 90°. The change made to the ramp in FIG. 6 is to basically present the multi-slope ramp in an inclined position such that a line parallel to the ramp surface in any particular section intersects the centerline 20 at some angle other than a right angle, as suggested in FIG. 5. FIG. 7 again indicates that step-wise changes between ramps can be vertical walls, as shown in FIG. 5, or can be one or more arced surfaces to make the transition from a greater axial component toward the wall to a lesser one toward the centerline.

Accordingly, the provision of dual ramps makes a measured improvement in the capacity without sacrificing separation efficiency. The width of each ramp and the absolute angle with respect to the inlet 12 can be varied and the relative angles can also be varied without departing from the spirit of the invention. As previously stated, optimally for the particular design described above, the ramp angles are 3° and 10° for the inner and outer ramps 16 and 14, respectively. The ratio of gradients of the outer ramp 14 to the inner ramp 16 can be as low as about 1:2 and as high as about 1:5. With only a single inlet, the ramps can extend longer than 180° and can go around 360°.

The foregoing disclosure and description of the invention are illustrative and explanatory thereof, and various changes in the size, shape and materials, as well as in the details of the illustrated construction, may be made without departing from the scope of the invention.

What is claimed is:

1. A hydrocyclone comprising a body having a back wall at one end of the body, through which back wall there is a central overflow outlet, an inlet for intake of a stream of fluid, the inlet located at the periphery of the body proximate to the back wall, and a central underflow outlet at the opposite end of the body, where:

the back wall presents an interior face with at least two ramps sloped relative to the back wall for redirecting the stream of fluid entering the hydrocyclone to flow axially along the hydrocyclone in at least two different paths having at least two axial velocity components for improved phase separation performance.

2. The hydrocyclone of claim 1, further comprising:

said body having a longitudinal axis extending from said overflow outlet to said underflow outlet;

said at least two ramps comprise a radially inner ramp and a radially outer ramp, each defining a generally helical surface at a distinct slope extending from adjacent said inlet toward said underflow outlet.

3. The hydrocyclone of claim 2, wherein:

said inner radial ramp extends at a shallower slope toward said underflow outlet than said outer radial ramp.

4. The hydrocyclone of claim 3, wherein:

the slope of said outer radial ramp extends at more than twice the slope of that of said inner radial ramp.

5. The hydrocyclone of claim 2, further comprising:

a wall disposed generally equidistant from said longitudinal axis and marking a boundary between said inner and outer radial ramps of said face.

6. The hydrocyclone of claim 2, wherein:

said helical surfaces of the ramps have a flat cross-section.

7. The hydrocyclone of claim 2, wherein:

said helical surfaces of the ramps have a curved cross-section.

8. The hydrocyclone of claim 1, wherein:

the slope of each ramp is greater than that of the ramp spaced radially inwardly thereof.

9. The hydrocyclone of claim 1, wherein:

the back wall face presents a generally smooth, continuous surface.

10. The hydrocyclone of claim 1, wherein:

at least a portion of the back wall face is inclined relative to a longitudinal axis of the hydrocyclone extending from the overflow outlet to the underflow outlet.

* * * * *